(12) United States Patent
Swift et al.

(10) Patent No.: US 8,573,927 B2
(45) Date of Patent: Nov. 5, 2013

(54) BACK-UP FEATHERER

(75) Inventors: Andrew Swift, Uttoxeter (GB); Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 483 days.

(21) Appl. No.: 12/954,765

(22) Filed: Nov. 26, 2010

(65) Prior Publication Data

US 2011/0171030 A1    Jul. 14, 2011

(30) Foreign Application Priority Data

Jan. 8, 2010 (GB) .................................. 1000198.0

(51) Int. Cl.
*F01D 7/00* (2006.01)
(52) U.S. Cl.
USPC .................................... 415/122.1; 416/157 R
(58) Field of Classification Search
USPC ............... 415/122.1, 148; 416/31, 44, 47, 48, 416/157 R
See application file for complete search history.

(56) References Cited

U.S. PATENT DOCUMENTS

| | | | | |
|---|---|---|---|---|
| 4,462,753 | A | * | 7/1984 | Harner et al. .................... 416/48 |
| 4,591,313 | A | * | 5/1986 | Miyatake et al. ............. 416/155 |
| 5,174,718 | A | | 12/1992 | Lampeter et al. |
| 5,897,293 | A | * | 4/1999 | Arel et al. ........................ 416/46 |
| 6,059,528 | A | * | 5/2000 | Danielson et al. .............. 416/46 |

FOREIGN PATENT DOCUMENTS

| | | |
|---|---|---|
| EP | 0 363 997 A2 | 4/1990 |
| EP | 0 409 552 A2 | 1/1991 |
| EP | 1 881 176 A2 | 1/2008 |
| GB | 2 347 974 A | 9/2000 |

OTHER PUBLICATIONS

Great Britain Search Report issued in Application No. 1000198.0; dated May 7, 2010.

* cited by examiner

*Primary Examiner* — Edward Look
*Assistant Examiner* — Liam McDowell
(74) *Attorney, Agent, or Firm* — Oliff & Berridge, PLC

(57) ABSTRACT

A back-up featherer for an engine arrangement having a main hydraulic actuator which angularly displaces propellers of a propeller assembly of the engine arrangement, and fluid supply lines for transferring hydraulic fluid between a hydraulic pressure power source located on a static structure of the engine arrangement and the main hydraulic actuator. The back-up featherer has a back-up actuator assembly for angular displacement of the propellers, the back-up actuator assembly rotating with the propeller assembly, a signal detector operatively connected to the back-up actuator assembly and rotates with the propeller assembly, and a back-up rotating coupling. A static side of the back-up rotating coupling is mounted to the static structure of the engine arrangement and communicates with a regulator located on a static structure of the engine arrangement. A rotating side of the back-up hydraulic rotating coupling rotates with the propeller assembly and communicates with the signal detector.

14 Claims, 3 Drawing Sheets

BACK-UP FEATHERER

BACKGROUND

The present invention relates to a back-up featherer for an engine arrangement having a main hydraulic actuator which angularly displaces propellers of a propeller assembly of the engine arrangement.

Aero propellers, either single rotor or contra-rotating, usually have a means of varying the blade pitch via a pitch control mechanism (PCM), to optimise efficiency of thrust delivery and to reduce noise throughout the flight envelope, to provide reverse thrust, and to be able to feather the blades to control drag and rotor speed in some powerplant failure cases. There are a number of established ways of configuring a PCM, but all feature a source of power, prime mover, mechanism from prime mover to blade, and a failsafe system. The power source can be in the static or rotating field, although it is more common for it to be in the static field to avoid static to rotating control communication issues and for easier line replacement of faulty components. However, where the power source is in the static field, a means of transferring the power to the rotating field(s) is required.

For a static electrical power source the transfer is typically achieved via slip rings. These are used on single propeller assembly turboprop engines. However, they suffer from a high maintenance burden. Further, on an engine having two contra-rotating propeller assemblies, and particularly such an engine where the exhaust is ducted under the propeller blade roots, the slip rings would experience very high operating speeds which would significantly reduce slip ring life. The high speeds result from a need to locate the rings at large radial distances in a non-oily zone, as well as from the high relative speeds caused by contra-rotation. Thus slip rings are not seen as a viable solution for power source transfer in contra-rotating propeller assemblies.

For a static hydraulic power source, the transfer can be achieved by rotating hydraulic couplings. For example, in a single rotor engine arrangement, the propeller assembly may be driven by a hollow propeller shaft. A rotating hydraulic coupling can be provided at one end of the propeller shaft, with hydraulic supply lines running inside the shaft from the coupling to a PCM prime mover (e.g. a hydraulic actuator) adjacent the propeller blades. The propeller shaft, supply lines and prime mover are all in the rotating field. A hydraulic pressure power source, which is in the static field, supplies hydraulic fluid to the coupling, and thence to the supply lines.

However, a fundamental design constraint on a rotating hydraulic coupling is that the product (PV) of static to rotating interface velocity (V) and hydraulic pressure (P) should be kept within limits to maintain seal life, assuming positive sealing is necessary. Since propeller rotational speed is generally predetermined, reducing the diameter of the rotating interface is thus of prime importance. Even in circumstances where some leakage is permissible from the rotating hydraulic coupling, reducing the rotating interface diameter helps to decrease the amount of that leakage.

Turboprop engines, whether having a single propeller assembly or two contra-rotating propeller assemblies, employ a reduction gearbox. As shown schematically in FIG. 1, such a gearbox 1 can be of a step-aside shaft configuration in which a drive shaft 2 extending from the free power turbine 3 of the engine 4 is laterally offset from the propeller shaft 5 of the propeller assembly 6. In this configuration, a small diameter, and hence low PV value and low leakage hydraulic coupling 7 may be located at the rear of the gearbox on the end of the propeller shaft, which is hollow. As described above, supply lines 8 can run along the inside of the propeller shaft to supply a hydraulic actuator 9, which rotates with the propeller assembly, with hydraulic fluid from a static hydraulic pressure power source 10.

Alternatively, as shown schematically in FIG. 2, the gearbox 1 can be of a coaxial epicyclic configuration, in which typically a sun gear of the gearbox is driven by and coaxial with the drive shaft 2 extending from the free power turbine 3 of the engine 4. However, as the axis of the propeller, gearbox and gas generator are coincident, it is more problematic to arrange for a small diameter hydraulic coupling 7 with an acceptably low PV value and low leakage rate because the static part of the coupling is outside the propeller shaft 5 outer diameter.

In the event of PCM failure, it may be desirable to move the blades to coarse to prevent dangerous increases in engine speed. In the event of engine failure, it may likewise be desirable to move the blades to coarse to reduce aircraft gliding resistance. However, the combined effect of rotational and aerodynamic forces acting on the blades tends to urge the blades to fine. Thus PCMs usually have a failsafe arrangement for preventing undesirable pitch variation in the event of power failure.

FIG. 3 shows schematically a longitudinal cross-section through a prior art PCM for varying the pitch of a row of propeller blades of a propeller assembly. The PCM comprises a hydraulic cylinder 11 and piston 12 which extend along the rotational axis X of the propeller blades 13 (only one of the propeller blades being shown in FIG. 3). The cylinder contains hydraulic fluid (e.g. oil), and a wall 14 fluidly seals the end of the cylinder. The piston divides the cylinder into two chambers 15, 16. By varying the fluid pressure difference between the two chambers, the piston can be moved to the left or the right along the axis X.

A quill 17 extends radially inwardly from the inboard end of each propeller blade 13 along the rotational axis Y of the blade, the quill connecting to an end of a crank arm 18 which has its other end in a respective retaining recess 19 formed at the end of the piston 12. By this mechanism, movement of the piston along the rotational axis X is converted into pitch-changing rotation of the blade about rotational axis Y.

The cylinder 11 is part of a larger housing which also provides a fixing arrangement 20 for the propeller blades 13 and a rotation drive input 21 for turning the propeller assembly. The drive input is typically connected to the output shaft of an engine gearbox. Hydraulic fluid for the chambers 15, 16 is provided by a fluid transmission tube 22 which extends axially from the drive input. A rotating fluid coupling 23 at the end of the tube allows fluid to be transmitted between the static and rotating fields.

A ball screw 24 (i.e. a screw with a plurality of balls located in the thread of the screw) extends along the rotational axis X, an end of the ball screw 24 being fixed by a hydraulically signalled brake 25 to the wall of the cylinder 11. A nut 26 which is axially and rotationally fixed relative to the piston 12 is threadingly engaged to balls of the ball screw. Lubricated in the hydraulic fluid, the balls provide a low friction threaded connection between the screw and the nut and offer little resistance to the axial movement of the piston in the cylinder whilst the pressurised de-activated brake allows the screw to rotate. However, in the event of fluid pressure loss, the brake activates and increases the frictional resistance to rotational movement of the screw, which restrains movement of the nut and piston and thereby prevents changes to the pitch of the propeller blades 13 in the fine direction.

PCMs, such as the one shown in FIG. 3, require the propeller assembly to have a central zone along its rotational axis for installation of the apparatus. Generally, such a zone is available on single propeller engines where the propeller assembly is mounted to one side of the engine's drive gearbox. However, other engine arrangements, and particularly in-line arrangements, may not have this zone available. For example, EP A 1881176 describes a contra-rotating propeller engine with a pair of propeller blade assemblies which rotate in opposite directions as a result of association with a coaxial epicyclic gear assembly acting as a differential gearbox. The propeller assemblies are in the "pusher" configuration, with the free power turbine drive shaft, static support structure for the propeller assembly rotors and the gearbox occupying central space on the axis of the forward propeller assembly, and thereby rendering a centrally-located ball screw style pitch lock apparatus impractical for at least the forward propeller assembly. Likewise, a centrally-located ball screw style pitch lock system would be impractical for the rear propeller assembly of a propeller engine with a pair of contra-rotating "puller" propeller blade assemblies driven by an in-line gear assembly.

The pitch of the propeller blades 13 is actively controlled by pitch control valves 27 which change the pressures in "to fine" fluid supply line 28 and "to coarse" fluid supply line 29 to vary the pressure within the chambers 15, 16 and thereby to cause pitch angle rotation. The pitch control valves 27 are supplied with hydraulic fluid by engine and gearbox mounted hardware such as a pump 30.

Fluid pressure loss within the chambers, which restrains movement of the nut 26 and piston 12 and thereby prevents changes to the pitch of the propeller blades 13 in the fine direction, follows from de-pressurisation of "pitch lock" line 31. This de-pressurisation may be due to system command to a special pitch lock control valve or through general loss of hydraulic system pressure.

The system also includes a separate back-up feather pump 32 which feeds hydraulic pressure into the primary system "to coarse" fluid supply line 29, thereby increasing the blade angle which will reduce rotor speed and can reduce propeller drag at low angles.

The PCM is thus supported by two safety systems:
A pitch lock which holds the blade angle when completely de-energised, so that the rotor speeds and drags can be stabilised until the aircraft air speed, engine power or altitude changes.
A back-up feather system which allows the blade angle to be increased by means of a secondary source of hydraulic pressure, as long as the hydraulic integrity of the "to coarse" primary line from the control valves 27 through to the appropriate one of the chambers 15, 16 is intact.

This primary line typically includes: static external pipes, a rotating coupling, rotating pipes, an actuator cylinder, various static seals and piston head dynamic seals. Whilst high reliability of the line can be expected, a zero failure rate is difficult achieve. Further, for contra-rotating propeller systems, the "to coarse" primary line may be subject to a more complex route through the contra-rotating drive system, which potentially introduces more failure mode threats than single propeller systems which can make use of an offset gearbox.

SUMMARY

Thus an object of the present invention is to provide a back-up featherer which is less reliant on a "to coarse" primary line.

Accordingly, a first aspect of the present invention provides a back-up featherer for an engine arrangement having a main hydraulic actuator which angularly displaces propellers of a propeller assembly of the engine arrangement, the engine arrangement further having one or more fluid supply lines for transferring hydraulic fluid between a hydraulic pressure power source located on a static structure of the engine arrangement and the main hydraulic actuator, the back-up featherer having:

a back-up actuator assembly for angular displacement of the propellers, the back-up actuator assembly rotating with the propeller assembly, a signal detector that is operatively connected to the back-up actuator assembly and rotates with the propeller assembly, and a back-up rotating coupling, a static side of the back-up rotating coupling being mounted to the static structure of the engine arrangement and communicating with a regulator located on a static structure of the engine arrangement, and a rotating side of the back-up rotating coupling rotating with the propeller assembly and communicating with the signal detector, wherein the back-up actuator assembly angularly displaces the propellers when the signal detector detects a signal from the regulator to displace the propellers.

Thus, advantageously, the back-up featherer does not have to rely on a "to coarse" primary line, i.e. it can be an independent feathering system, having sufficient physical separation from the primary system to ensure no common mode failures between the primary and back-up feathering systems.

The back-up featherer may have any one, or to the extent that they are compatible, any combination of the following optional features.

Preferably, the back-up actuator assembly angularly displaces the propellers when the signal detector detects a signal indicating loss of pressure in the hydraulic pressure power source.

The regulator can be e.g. the hydraulic pressure power source, a controller for the hydraulic pressure power source, or a dedicated controller for the back-up actuator.

Preferably, the back-up actuator assembly is electrically-powered. Such an arrangement facilitates the powering of the back-up actuator assembly by a power source rotating with the propeller assembly. For example, the back-up featherer may further have an electrical generator for electrically powering the back-up actuator assembly, the generator utilising the rotation of the propeller assembly to generate the electrical power. The electrical generator may also provide power for e.g. anti-icing protection of the propellers. The back-up featherer may further have a battery to provide electrical power in case of electrical generator failure.

Preferably, the back-up featherer further has a unison ring which is coaxial with the propeller assembly, the unison ring being movable by the main hydraulic actuator and by the back-up actuator assembly to drive mechanisms for angular displacement of respective propellers. Advantageously, the unison ring can be installed coaxially to the propeller assembly, but not in the central zone along its rotational axis. The unison ring in turn can move a lever arm or cam follower at the end of a quill shaft extending from the base of each propeller.

Typically, the back-up rotating coupling is a hydraulic rotating coupling and the signal detector is a pressure signal detector, the static side of the back-up rotating coupling fluidly communicating with the hydraulic pressure power source. In this way, the pressure signal detector can directly sense the pressure in the hydraulic pressure power source. For example, the pressure signal detector can sense pressure loss in the hydraulic pressure power source, and the back-up actuator assembly can then angularly displace the propellers accordingly.

However, another option is for the back-up rotating coupling to be an electro-magnetic rotating coupling and the signal detector to be an electrical signal detector, the static side of the back-up rotating coupling electrically communicating with the regulator. The regulator can then be an electrical controller, such as an electrical controller for the hydraulic pressure power source, or a dedicated electrical controller for the back-up actuator. For example, the electrical signal detector may detect a loss of pressure in the hydraulic pressure power source indirectly by detection of an electrical signal (or interruption of an electrical signal) from an electrical controller for the hydraulic pressure power source. The back-up actuator assembly can then angularly displace the propellers as appropriate. The electro-magnetic rotating coupling preferably has a non-contacting interface between the static and the rotating sides. This can be achieved, for example, by a static coil and rotating transformer arrangement. In this way, close-coupling of the static and rotating sides is possible.

A second aspect of the present invention provides an engine arrangement having:

a propeller assembly, a main hydraulic actuator for angular displacement of propellers of the propeller assembly, the main hydraulic actuator rotating with the propeller assembly, and one or more fluid supply lines for transferring hydraulic fluid between a hydraulic pressure power source located on a static structure of the engine arrangement and the main hydraulic actuator;

wherein the engine arrangement further has a back-up featherer according to any one of the preceding claims, the static side of the back-up rotating coupling communicating with a regulator located on a static structure of the engine arrangement, and the back-up actuator assembly being for angular displacement of the propellers of the propeller assembly. The back-up featherer may have any one, or to the extent that they are compatible, any combination of the optional features of the first aspect.

The engine arrangement may have any one, or to the extent that they are compatible, any combination of the following optional features.

The engine arrangement typically further has a gear assembly that drives the propeller assembly, the gear assembly being driven by a power drive shaft that joins to the gear assembly at a first side thereof.

The power drive shaft may have a longitudinally extending internal cavity, and the engine arrangement may further have:

a static conduit which extends along the internal cavity, the conduit penetrating the gear assembly such that a portion of the conduit projects from an opposing second side of the gear assembly, and the fluid supply lines being routed inside the static conduit, and a main hydraulic rotating coupling mounted to the projecting portion of the static conduit, the fluid supply lines fluidly communicating with the main hydraulic actuator via the main hydraulic rotating coupling.

Advantageously, as the static conduit extends along the internal cavity of the power drive shaft, the main hydraulic rotating coupling mounted to the projecting portion of the static conduit can have a relatively small diameter and thus can provide a low PV value and low leakage rate.

Preferably, the static side of the back-up rotating coupling is mounted to the projecting portion of the static conduit. When the back-up rotating coupling is a hydraulic coupling, this arrangement also allows the back-up hydraulic rotating coupling to have a relatively small diameter and thus a low PV value and low leakage rate.

Preferably, the static side of the back-up rotating coupling communicates with the regulator over a communication line which is routed inside the static conduit. For example, when the back-up rotating coupling is a hydraulic coupling, the communication line can be a fluid pressure line communicating with the hydraulic power source. When the back-up rotating coupling is an electro-magnetic coupling, the communication line can be an electrical signal line.

The arrangement can be used for engines having a single propeller assembly. However, preferably the engine arrangement is for a contra-rotating engine. For example, the engine arrangement may be for a contra-rotating engine in which the propeller assembly, the main hydraulic actuator, the fluid supply lines and the main hydraulic rotating coupling are respectively a second propeller assembly, a second main hydraulic actuator, second fluid supply lines and a second hydraulic rotating coupling of the engine arrangement; wherein the engine arrangement further has:

a first propeller assembly arranged to rotate in an opposite direction to the second propeller assembly, the gear assembly also driving the first propeller assembly a first main hydraulic actuator for angular displacement of propellers of the first propeller assembly, the first hydraulic actuator rotating with the first propeller assembly, one or more first fluid supply lines for transferring hydraulic fluid between the hydraulic pressure power source and the first main hydraulic actuator, the first fluid supply lines being routed inside the static conduit, and a first main hydraulic rotating coupling which is mounted to the projecting portion of the static conduit, the first fluid supply lines fluidly communicating with the first main hydraulic actuator via the first main hydraulic rotating coupling.

Typically, the gear assembly is an epicyclic gear assembly having e.g. a sun gear, and planetary gears driven by the sun gear and in turn driving a carrier. For example, the power drive shaft can drive the sun gear, and the carrier can drive the first propeller assembly. The epicyclic gear assembly may further have a ring gear driven by the planetary gears. In the context of a contra-rotating engine, the ring gear can drive the second propeller assembly.

Conveniently, the static conduit may penetrate an epicyclic gear assembly through the sun gear, which can help to avoid or reduce detrimental effects on gear assembly stiffness. Further, even if the gear assembly malfunctions, the ability of the fluid supply lines, and the fluid pressure line, to transfer hydraulic fluid along the static conduit is unlikely to be compromised.

The first propeller assembly and the first main hydraulic actuator may be located at the first side of the gear assembly, the first fluid supply lines being re-routed through the gear assembly between the first main hydraulic rotating coupling and the first main hydraulic actuator. Such an arrangement may be adopted, for example, in relation to a contra-rotating engine. Thus when the gear assembly is an epicyclic gear assembly and the first propeller assembly is driven by a carrier of the gear assembly, the first fluid supply lines may be re-routed through the planetary gears and carrier of the gear assembly. In such an arrangement, the first fluid supply lines may penetrate one or more of the planetary gears and/or pass between at least some of the planetary gears.

In the context of an engine arrangement for a contra-rotating engine, the second propeller assembly and the second main hydraulic actuator are preferably located at the second side of the gear assembly.

A third aspect of the present invention provides a contra-rotating, gas turbine engine having an engine arrangement according to the second aspect (the engine arrangement optionally having any one, or to the extent they are compatible, any combination of the optional features of the second aspect), the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially rearwardly from the power turbine section, wherein a forward mouth of the static conduit opens to a gap formed between the forwardly extending generator drive shafts and the rearwardly extending power drive shaft, the fluid supply lines from the hydraulic pressure power source and the communication line entering the static conduit at said mouth.

The gap thus provides a convenient means for routing the fluid supply lines and the communication line into the static conduit.

The engine may have any one or, to the extent they are compatible, any combination of the following optional features.

Typically, the gas turbine engine is axially aligned with the gear assembly, which is preferably an epicyclic gear assembly.

The gas turbine engine may have a row of nozzle guide vanes located at said gap, the fluid supply lines and the communication line being routed through one or more of the nozzle guide vanes to arrive at said mouth. The nozzle guide vanes can thus protect the fluid supply lines and the communication line from high working gas temperatures at the exit of the generator section of the engine.

BRIEF DESCRIPTION OF THE DRAWINGS

Embodiments of the invention will now be described by way of example with reference to the accompanying drawings in which.

DETAILED DESCRIPTION OF EMBODIMENTS

Figure 1:
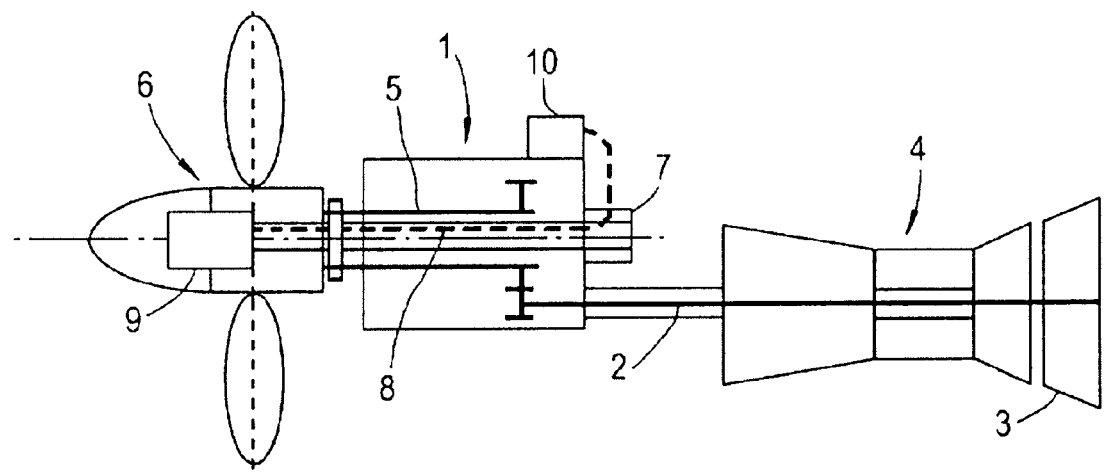
FIG. 1 shows a schematic longitudinal cross-section through a single propeller turboprop engine with a step-aside shaft configuration.
Figure 2:
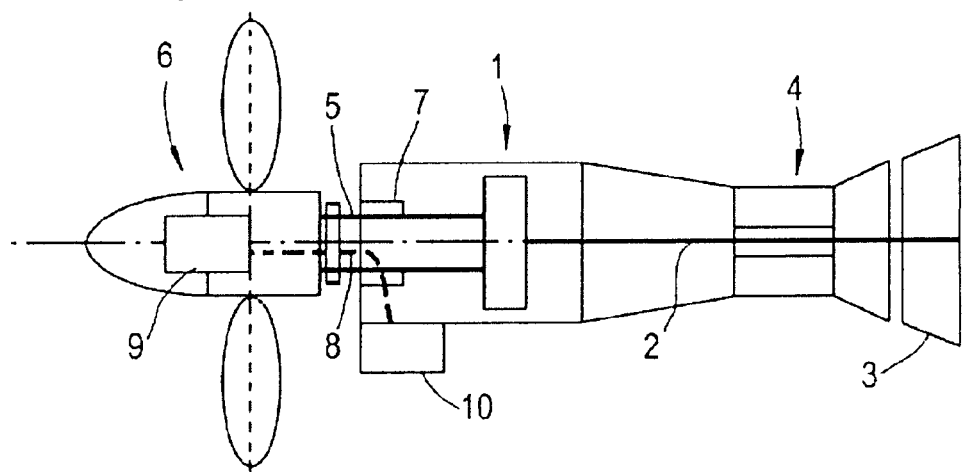
FIG. 2 shows a schematic longitudinal cross-section through a single propeller turboprop engine with an in-line shaft configuration.
Figure 3:
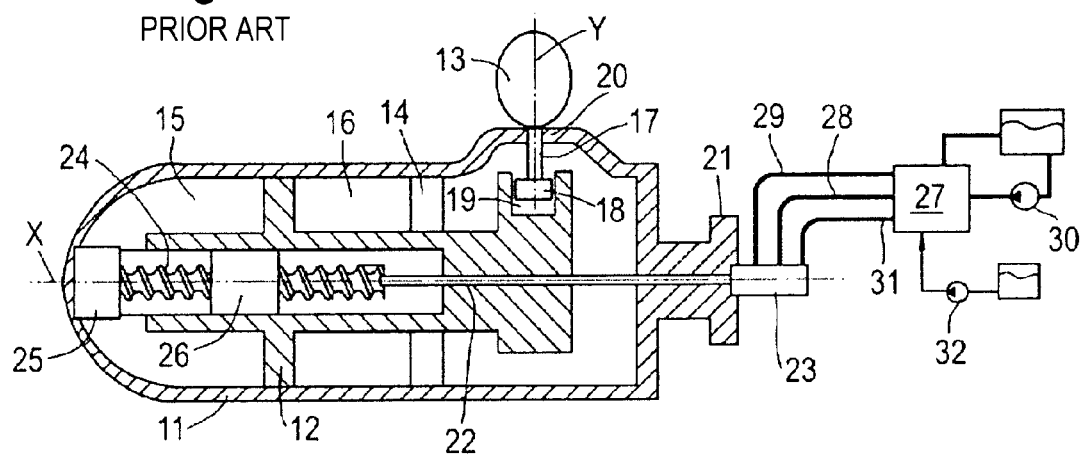
FIG. 3 shows schematically a longitudinal cross-section through a prior art screw pitch lock apparatus for varying the pitch of a row of propeller blades of a propeller assembly.
Figure 4:
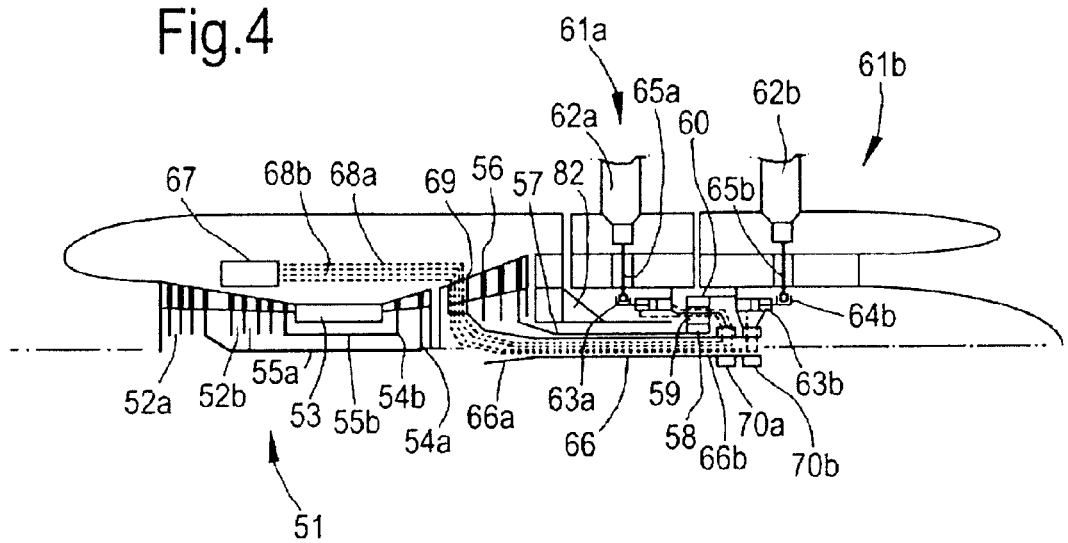
FIG. 4 shows a schematic longitudinal cross-section through a pusher style, contra-rotating propeller, turboprop engine with an in-line shaft configuration.

A schematic longitudinal cross-section through a pusher style, contra-rotating propeller, turboprop engine is shown in FIG. 4. The engine has a generator section 51 comprising in flow series low pressure 52a and high pressure 52b compressor subsections, a combustor subsection 53, and high pressure 54b and low pressure 54a turbine subsections. Generator drive shafts 55a, 55b connect the respective compressor and turbine subsections. Downstream of the generator section is a free power turbine 56 which drives a rearwardly extending power drive shaft 57.

The distal end of the power drive shaft 57 drives a sun gear 58 of an epicyclic gear assembly which is coaxial with the power drive shaft. The sun gear drives planetary gears 59, which in turn drive a carrier (not shown) and a ring gear 60. The carrier and ring gear rotate in opposite directions. The carrier drives a first propeller assembly 61a on the upstream side of the gear assembly, while the ring gear drives a contra-rotating second propeller assembly 61b on the downstream side of the gear assembly. Each propeller assembly has a row of propeller blades 62a, 62b, with each blade being rotatable about its longitudinal axis to vary the blade pitch. The pitch variation for each propeller assembly is achieved by a respective main hydraulic actuator 63a, 63b which moves a corresponding unison ring 64a, 64b in the axial direction of the engine. The axial movement of the unison rings rotates the blades via a quill shaft and lever or cam follower arrangement 65a, 65b which extends from the base of each blade.

The power drive shaft 57 is hollow and a static conduit or central oil tube (COT) 66 extends along the internal cavity formed by the shaft. One end of the COT opens to a mouth 66a at the gap formed between the forward end of the power drive shaft and the rearward end of the low pressure generator drive shaft 55a. The other end of the COT penetrates through the centre of the sun gear 58 to form a projection 66b on the downstream side of the gear assembly. A hydraulic pressure power source 67 (comprising e.g. a hydraulic pump, valves and control unit) for actuating the actuators 63a, 63b is attached to an accessory gearbox (not shown) of the engine remote from the actuators 63a, 63b. The hydraulic fluid is typically filtered engine oil.

To transfer hydraulic fluid between the power source 67 and the actuators 63a, 63b, respective fluid supply lines 68a, 68b are routed from the source to the mouth 66a of the COT 66. The supply lines traverse the working gas annulus of the engine through a row of nozzle guide vanes 69 which are located between the generator section 51 and the free power turbine 56. This arrangement protects the supply lines from the high temperatures of the working gas. From the mouth of the COT, the supply lines are routed along the COT's internal cavity to arrive at the projection 66b on the downstream side of the gear assembly. A pair of axially spaced main hydraulic rotating couplings 70a, 70b are mounted to the projection, the upstream one associated with the hydraulic actuator 63a of the first propeller assembly 61a and the downstream one associated with the hydraulic actuator 63b of the second propeller assembly 61b. The internal sides of the couplings are formed by static fluid distributors while the external side of the upstream coupling 70a has a rotating sleeve that is driven by a drive bracket from the first propeller assembly 61a and the external side of the downstream coupling 70b has a rotating sleeve that is contra-driven by a drive bracket from the second propeller assembly 61b. Fluid is transmitted across upstream coupling 70a for those supply lines 68a which are routed to the main hydraulic actuator 63a of the first propeller assembly, while fluid is transmitted across downstream coupling 70b for the remaining supply lines 68b which are routed to the main hydraulic actuator 63b of the second propeller assembly.

The route taken by the supply lines 68b from the downstream coupling 30b to the main hydraulic actuator 63b of the second propeller assembly 61b can be relatively direct. In contrast, the route taken by the supply lines 68a from the upstream coupling 70a to the main hydraulic actuator 63a of the first propeller assembly 61a is more complicated as it passes through the gear assembly. Conveniently, the supply lines 68a are routed through the planetary gears 59 and carrier, which rotate with the first propeller assembly.

The engine arrangement overcomes problems with conventional propeller PCMs, particularly when applied to a pusher style contra-rotating open rotor with an in-line differential power gearbox. In particular, the arrangement of the COT 66 and the main hydraulic rotating couplings 70a, 70b mounted to the COT projection 66b allows small diameter couplings to be used and hence low PV values and low leakage rates can be achieved. Further the stiffness of the gear assembly is not substantially compromised by the COT extending through the sun gear 58. Also the potential for axial jamming of the transfer rods (used in EP A 1881176) and a consequent inability to feather the propeller blades to control drag and rotor speed is avoided.

The COT 66 can also be used to route other power lines or control lines through the engine, these lines being e.g. hydraulic or electrical.

Figure 5:
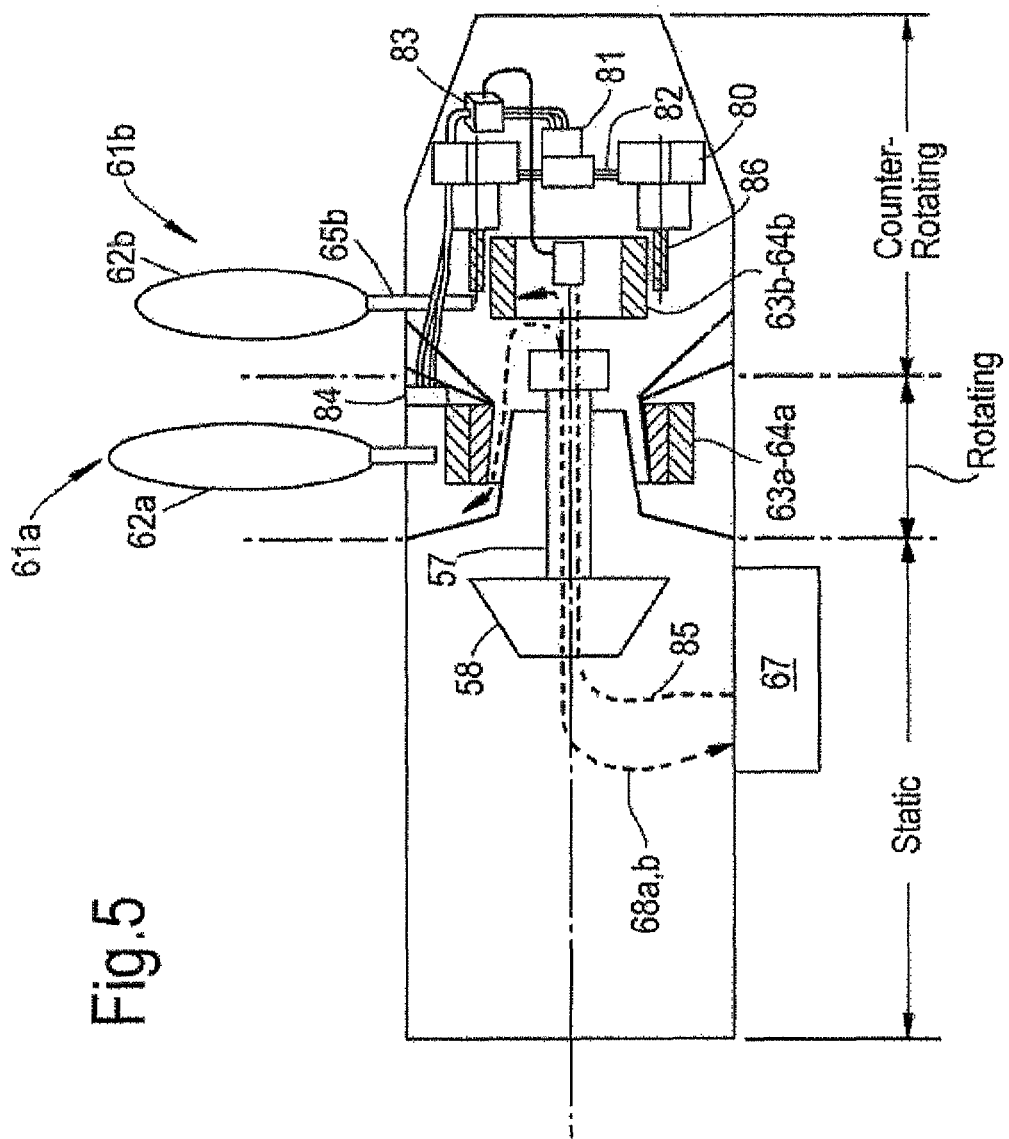
FIG. 5 shows schematically a back-up featherer used with the second propeller assembly of the engine of FIG. 4.

FIG. 5 shows schematically a back-up featherer used with the second propeller assembly 61b of the engine of FIG. 4. Features common to FIGS. 4 and 5 share the same reference numbers. The feature 63a-64a is the combined assembly of main hydraulic actuator 63a and corresponding unison ring 64a, and the feature 63b-64b is the combined assembly of main hydraulic actuator 63b and corresponding unison ring 64b.

The back-up featherer comprises an actuator assembly formed from a plurality of rotary or linear drives 80 (for example three circumferentially spaced roller screws) driven by an electric motor and gear box 81 via a respective transmission drive 82. However, other forms of electrical actuator are possible. For example, a single roller screw may be used, or ball screws may be used instead of roller screws. The drives 80 move the unison ring 64b to feather the propellers 62b.

The motor 81 is controlled by a motor controller 83 which takes electrical power produce by embedded generators 84 to drive the motor. The generator 84 makes use of the contra-rotation between the two rotors of the propeller assemblies 61a, b to produce the power. The generator can also be used to produce power for propeller blade anti-icing protection.

The back-up featherer also comprises a fluid pressure line 85 and a pressure detector 86. The fluid pressure line extends from pitch change valves of the hydraulic pressure power source 67, along the inside of the COT 66, and across a back-up hydraulic rotating coupling (not shown) mounted on the COT projection 66b on the downstream side of the gear assembly to the pressure detector. One side of the back-up hydraulic rotating coupling is therefore static and the other side rotates with the second propeller assembly 61b.

The pressure detector 86 thus senses the hydraulic fluid pressure of the primary pitch change apparatus of the second propeller assembly 61b, the sensed pressure being transmitted to the controller 83. The motor 81 is normally dormant. However, if the pressure detector senses a drop in pressure, the controller commands the motor to rotate the propellers 62b towards "coarse". In this way, the back-up featherer provides a failsafe such that if pressure is lost in the primary pitch change apparatus the back-up featherer automatically feathers the propellers.

Like the fluid supply lines 68a, 68b, the fluid pressure line 85 traverses the working gas annulus of the engine through the row of nozzle guide vanes 69 to reach the mouth 66a of the COT 66. Although the fluid pressure line shares the nozzle guide vanes and COT with the fluid supply lines 68b, the back-up featherer is configured such that even if this shared pathway sustains damage, the back-up featherer still has the capability to feather the propellers 62b. Thus the back-up featherer is functionally independent of the primary pitch change apparatus of the second propeller assembly 61b.

The back-up featherer may have a static external controller (not shown) which, by operating the pitch change valves of the hydraulic pressure power source 67, can signal to the controller 83 via the fluid pressure line 85. In this way, the back-up featherer can rotate the propellers 62b to any position between the present position and fully "coarse".

The back-up featherer may further have stroke sensors (not shown) to reduce full stroke deceleration of the drives 80 and to switch off the motor 81 at the end of stroke to save power and reduce the need for gearbox cooling.

The back-up featherer may further have a battery (not shown) to provide electrical power in case of generator 84 failure.

As an alternative to routing the fluid pressure line 85 inside the COT and directly detecting pressure loss in the hydraulic pressure power source 67, the back-up featherer may have an electrical signal line which extends from a static, electrical pitch change controller of the hydraulic pressure power source or from a static, dedicated controller for the back-up featherer to the motor controller 83. In place of the back-up hydraulic rotating coupling, a back-up electro-magnetic rotating coupling is mounted on the COT projection 66b. Such a coupling may have a static coil and rotating transformer arrangement. The pressure detector 86 is then not needed, the motor controller containing an electrical signal detector which takes its place. The electrical signal line may carry, for example, a standard signal as long as the primary pitch change mechanism is operating normally. When the standard signal is interrupted, however, this is detected by the signal detector of the motor controller, which then commands the motor as described above. A dedicated controller for the back-up featherer may be preferred, however, if it is desired to be able to signal to the motor to rotate the propellers 62b to any position between the present position and fully "coarse".

The back-up featherer can provide:

A high integrity system.

A system which is independently testable.

Ready access for maintenance.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A back-up featherer for an engine arrangement having a main hydraulic actuator which angularly displaces propellers of a propeller assembly of the engine arrangement, the engine arrangement further having one or more fluid supply lines for transferring hydraulic fluid between a hydraulic pressure power source located on a static structure of the engine arrangement and the main hydraulic actuator, the back-up featherer having:

a back-up actuator assembly for angular displacement of the propellers, the back-up actuator assembly rotating with the propeller assembly, a signal detector that is operatively connected to the back-up actuator assembly and rotates with the propeller assembly, and a back-up rotating coupling, a static side of the back-up rotating coupling being mounted to the static structure of the engine arrangement and communicating with a regulator located on a static structure of the engine arrangement, and a rotating side of the back-up rotating coupling rotating with the propeller assembly and communicating with the signal detector, wherein the back-up actuator assembly angularly displaces the propellers when the signal detector detects a signal from the regulator to displace the propellers.

2. The back-up featherer according to claim 1, wherein the back-up actuator assembly is electrically-powered.

3. The back-up featherer according to claim 2, further having an electrical generator for electrically powering the back-up actuator assembly, the generator utilising the rotation of the propeller assembly to generate the electrical power.

4. The back-up featherer according to claim 1, further having a unison ring which is coaxial with the propeller assembly, the unison ring being movable by the main hydraulic actuator and by the back-up actuator assembly to drive mechanisms for angular displacement of respective propellers.

5. The back-up featherer according to claim 1, wherein the back-up rotating coupling is a hydraulic rotating coupling and the signal detector is a pressure signal detector, the static side of the back-up rotating coupling fluidly communicating with the hydraulic pressure power source.

6. The back-up featherer according to claim 1, wherein the back-up rotating coupling is an electro-magnetic rotating coupling and the signal detector is an electrical signal detector, the static side of the back-up rotating coupling electrically communicating with the regulator.

7. An engine arrangement having:
a propeller assembly,
a main hydraulic actuator for angular displacement of propellers of the propeller assembly, the main hydraulic actuator rotating with the propeller assembly, and
one or more fluid supply lines for transferring hydraulic fluid between a hydraulic pressure power source located on a static structure of the engine arrangement and the main hydraulic actuator;
wherein the engine arrangement further has a back-up featherer according to claim 1, the static side of the back-up rotating coupling communicating with a regulator located on a static structure of the engine arrangement, and the back-up actuator assembly being for angular displacement of the propellers of the propeller assembly.

8. The engine arrangement according to claim 7, further having a gear assembly that drives the propeller assembly, the gear assembly being driven by a power drive shaft that joins to the gear assembly at a first side thereof.

9. The engine arrangement according to claim 7, wherein the power drive shaft has a longitudinally extending internal cavity, and the engine arrangement further has:
a static conduit which extends along the internal cavity, the conduit penetrating the gear assembly such that a portion of the conduit projects from an opposing second side of the gear assembly, and the fluid supply lines being routed inside the static conduit, and
a main hydraulic rotating coupling mounted to the projecting portion of the static conduit, the fluid supply lines fluidly communicating with the main hydraulic actuator via the main hydraulic rotating coupling.

10. The engine arrangement according to claim 9, wherein the static side of the back-up rotating coupling is mounted to the projecting portion of the static conduit.

11. The engine arrangement according to claim 9, wherein the static side of the back-up rotating coupling communicates with the regulator over a communication line which is routed inside the static conduit.

12. The engine arrangement according to claim 9 which is for a contra-rotating engine, the propeller assembly, the main hydraulic actuator, the fluid supply lines and the main hydraulic rotating coupling being respectively a second propeller assembly, a second main hydraulic actuator, second fluid supply lines and a second hydraulic rotating coupling of the engine arrangement; wherein the engine arrangement further has:
a first propeller assembly arranged to rotate in an opposite direction to the second propeller assembly, the gear assembly also driving the first propeller assembly
a first main hydraulic actuator for angular displacement of propellers of the first propeller assembly, the first hydraulic actuator rotating with the first propeller assembly,
one or more first fluid supply lines for transferring hydraulic fluid between the hydraulic pressure power source and the first main hydraulic actuator, the first fluid supply lines being routed inside the static conduit, and
a first main hydraulic rotating coupling which is mounted to the projecting portion of the static conduit, the first fluid supply lines fluidly communicating with the first main hydraulic actuator via the first main hydraulic rotating coupling.

13. A gas turbine engine having an engine arrangement according to claim 12, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially rearwardly from the power turbine section, wherein a forward mouth of the static conduit opens to a gap formed between the forwardly extending generator drive shafts and the rearwardly extending power drive shaft, the fluid supply lines from the hydraulic pressure power source and the communication line entering the static conduit at said mouth.

14. The gas turbine engine according to claim 13 wherein a row of nozzle guide vanes are located at said gap, the fluid supply lines and the communication line being routed through one or more of the nozzle guide vanes to arrive at said mouth.

* * * * *